(12) United States Patent
Inada et al.

(10) Patent No.: US 6,322,256 B1
(45) Date of Patent: Nov. 27, 2001

(54) OPTICAL FIBER HOLDING CAPILLARY TUBE

(75) Inventors: Katsumi Inada; Hirokazu Takeuchi; Nagaharu Nakajima; Masanobu Minami; Tadashi Seto; Yoshimasa Yamaguchi; Masanori Wada; Kazunari Yamamoto; Sotohiro Nakajima, all of Shiga-ken (JP)

(73) Assignee: Nippon Electric Glass Co., Ltd., Shiga (JP)

( * ) Notice: Subject to any disclaimer, the term of this patent is extended or adjusted under 35 U.S.C. 154(b) by 0 days.

(21) Appl. No.: 09/444,396

(22) Filed: Nov. 22, 1999

(30) Foreign Application Priority Data

Nov. 24, 1998 (JP) .................................... 10-333314

(51) Int. Cl.$^7$ ...................................... G02B 6/36
(52) U.S. Cl. ............................ 385/84; 385/59; 385/66
(58) Field of Search ................ 385/59, 60, 62, 385/66, 68, 71, 72, 78, 84

(56) References Cited

U.S. PATENT DOCUMENTS

| | | |
|---|---|---|
| 4,179,186 | 12/1979 | Tynes . |
| 4,712,864 | * 12/1987 | Ellis et al. . |
| 4,931,076 | 6/1990 | Berkey . |
| 5,295,213 | 3/1994 | Ueda et al. . |
| 5,608,827 | * 3/1997 | Boscher et al. . |
| 6,173,097 | * 1/2001 | Throckmorton et al. . |

FOREIGN PATENT DOCUMENTS

| | | |
|---|---|---|
| 59-13450 | 3/1984 | (JP) . |
| 10-62653 | 3/1998 | (JP) . |
| 10-73742 | 3/1998 | (JP) . |
| 2788800 | 6/1998 | (JP) . |
| 11-64671 | 3/1999 | (JP) . |
| 11-64672 | 3/1999 | (JP) . |

* cited by examiner

*Primary Examiner*—Hung N. Ngo
(74) *Attorney, Agent, or Firm*—Arent Fox Kintner Plotkin & Kahn

(57) ABSTRACT

In the capillary tube 22, the cross section of the outer surface is substantially square, and the cross section of the insertion hole 23 is substantially square. Sides La, Lb of the outer surface have high dimensional accuracy and the insertion hole 23 is made to allow two optical fibers 5, 6 to be inserted while adjoining each other and arranged in order therein. The phases of the outer surface and the insertion hole 23 are relatively offset with each other, so that angles θa, θb which the sides 23a, 23b of the insertion hole 23 form with flat surfaces 22a, 22b of the outer surface are acute angles of substantially 45°±0.5°. Consequently, the flat surface 22a becomes substantially parallel to the center line M that connects the centers of the cores 5a, 6a of the two optical fibers 5, 6 inserted in the insertion hole 23, and the flat surface 22b becomes substantially perpendicular to the center line M.

20 Claims, 10 Drawing Sheets

K=2

K=3

K=4

K=5

FIG. 12 (A) (PRIOR ART)
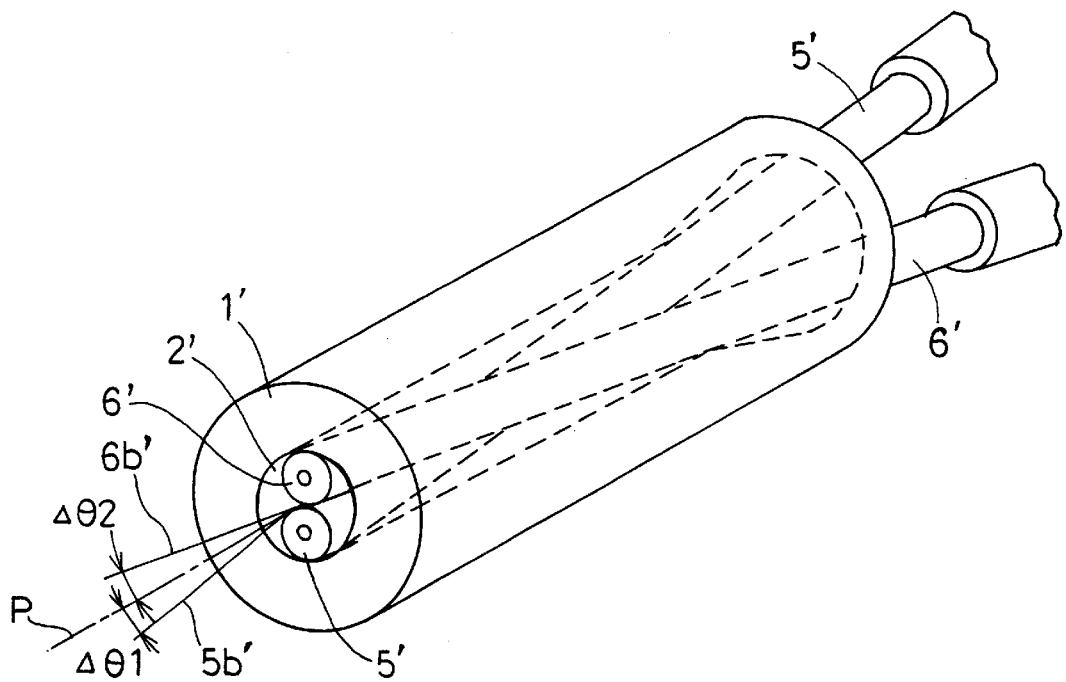
FIG. 12 (B) (PRIOR ART)
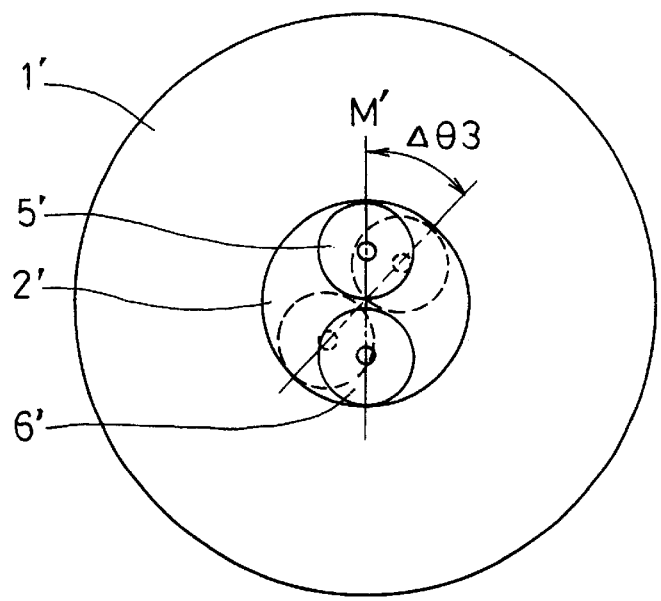

OPTICAL FIBER HOLDING CAPILLARY TUBE

BACKGROUND OF THE INVENTION

The present invention relates to an optical fiber holding capillary tube that is capable of inserting and holding a plurality of optical fibers therein in an ordered arrangement, and easily positioning and securing the optical fibers in relation to other optical components.

When dividing a signal transmitted through a single optical fiber to a plurality of optical fibers, or combining signals transmitted through a plurality of optical fibers into a single optical fiber, capillary tubes have been used to hold and secure the plurality of optical fibers. When positioning and securing two optical fibers in an accurately parallel arrangement, for example, a capillary tube $1'$ that has an insertion hole $2'$ having a circular cross section is used wherein two optical fibers $5'$, $6'$ are inserted, as shown in FIG. 12.

However, since the insertion hole $2'$ of the capillary tube $1'$ has a circular cross section, in the event of the two optical fibers $5'$, $6'$ cross each other in the insertion hole $2'$ as shown in FIG. 12(A), optical axis $5b'$ of the optical fiber $5'$ and optical axis $6b'$ of the optical fiber $6'$ are displaced from the center axis P of the insertion hole $2'$ by angles $\Delta\theta1$ and $\Delta\theta2$, respectively. As a consequence, the optical fibers $5'$, $6'$ are displaced from the proper relative position with optical elements such as a light emitting element, a light receiving element, a waveguide element and optical fibers that are disposed in parallel to the center axis P, resulting in increased connection loss.

Also as shown in FIG. 12(B), a center line $M'$ that connects the center of the optical fiber $5'$ and the center of the optical fiber $6'$ is displaced from the normal position by an angle $\Delta\theta3$ in the circumferential direction. This makes it necessary to adjust the relative positions of the optical fibers $5'$, $6'$ with other optical elements in the circumferential direction. Since some of optical fibers, so-called single-mode fibers, are as small as 5 $\mu$m to 10 $\mu$m in the diameter of the core where optical signals are transmitted, it may be extremely difficult to adjust the relative position described above.

SUMMARY OF THE INVENTION

An object of the present invention is to provide a highly reliable optical fiber holding capillary tube that is capable of holding a plurality of optical fibers inserted therein in an accurately ordered arrangement, and easily positioning and securing the optical fibers held in the ordered arrangement in relation to other optical components.

The present invention, in order to achieve the object described above, provides the optical fiber holding capillary tube that has an insertion hole of substantially quadrangular cross section for holding a plurality of optical fibers inserted therein in an ordered arrangement, wherein the cross section of the insertion hole is substantially square and distance L between opposing inner wall surfaces of the insertion hole and diameter D of the optical fiber satisfy a relationship of $(1+2^{(k-2)/2})D<L\leq(1.05+2^{(k-2)/2})D$ (where k is 1 or greater integer), in order to make it possible to insert a plurality of optical fibers having the diameter D while adjoining each other into the insertion hole.

For example, when it is assumed that two adjoining optical fibers having diameter D can be held without clearance to the wall surface in the insertion hole that has substantially square cross section as shown in FIG. 1(B), the relation between the distance L between the opposing inner wall surfaces of the insertion hole and the diameter D of the optical fiber becomes $L=(1+2^{1-2)/2})D$, namely $L=(1+1/\sqrt{2})D$. In practice, however, since some clearance is required in order to insert the two optical fibers into the insertion hole, the distance L of the insertion hole must satisfy a condition of $(1+1/\sqrt{2})D<L$. Also in the case of a single-mode optical fiber, since the core diameter where the optical signals are transmitted is from 5 to 10% of the diameter D of the optical fiber, the distance L must satisfy a relation of $L\leq(1.05+1/\sqrt{2})D$ in order to achieve a positioning accuracy of within about 5% of the diameter D in the positioning of the two optical fibers. In practice, it is required to satisfy a relationship of $(1.71)D<L\leq(1.76)D$ upon approximation of $1+1/\sqrt{2}\approx1.71$ and $1.05+1/\sqrt{2}\approx1.76$.

The present invention also provides an optical fiber holding capillary tube that has the insertion hole of substantially quadrangular cross section for holding a plurality of optical fibers inserted therein in an ordered arrangement, wherein the cross section of the insertion hole is substantially rectangular and distance L1 between opposing longer sides of the insertion hole, distance L2 between opposing shorter sides of the insertion hole and diameter D of the optical fiber satisfy relationships of $D<L1\leq(1.05)D$ and $nD<L2\leq(n+0.05)D$, in order to make it possible to insert n optical fibers ($2\leq n$) each having the diameter D into the insertion hole in parallel to each other.

For example, when it is assumed that n pieces of adjoining optical fibers each having diameter D can be held in parallel to each other without clearance to the wall surface in the insertion hole that has substantially rectangular cross section as shown in FIG. 5, the relation between the distance L1 between the longer sides of the insertion hole and the diameter D of the optical fiber is expressed as $L1=D$, and the relation between the distance L2 between the opposing shorter sides of the insertion hole and the diameter D of the optical fiber is expressed as $L2=nD$ ($2\leq n$). In practice, however, since some clearance is required in order to insert the n pieces of optical fibers each having diameter D into the insertion hole, the distance L1 between the longer sides must satisfy a condition of $D<L1$ and the distance L2 between the shorter sides must satisfy a condition of $nD<L2$. Also in order to position n pieces of single-mode optical fibers with an accuracy of at least within about 5% of the diameter D of the optical fiber, the distance L1 across the longer sides must satisfy a relation of $L1<(1.05)D$ and the distance L2 across the shorter sides must satisfy a relation of $L2\leq(n+1.05)D$.

In the optical fiber holding capillary tube that has the insertion hole of substantially square or rectangular cross section described above, a plurality of optical fibers can be connected to other optical components while being aligned with the optical axes thereof, by positioning the optical fibers that are held in an ordered arrangement in the insertion hole while maintaining optical matching with the other optical components by using holding means. The holding means may be, for example, a cylindrical sleeve.

Also in the optical fiber holding capillary tube that has the insertion hole of substantially square or rectangular cross section described above, a plurality of optical fibers can be connected to each other, by holding the optical fibers together end to end while inserting a plurality of optical fibers from an opening on one end of the insertion hole, inserting a plurality of optical fibers from an opening on the other end of the insertion hole and holding the optical fibers on both sides in aligned positions.

The present invention also provides an optical fiber holding capillary tube comprising an insertion hole of substantially quadrangular cross section wherein a plurality of optical fibers are inserted and held in an ordered arrangement, and at least one flat surface provided on an outer surface thereof, wherein the flat surface is disposed to form a predetermined acute angle with a side of the insertion hole and is located at a predetermined distance from the center of the insertion hole.

When the flat surface provided on the outer surface of the optical fiber holding capillary tube of the present invention is put into surface contact with a fixed surface that serves as a reference for the other optical components, positions of the centers of the plurality of optical fibers with respect to the fixed surface are determined. Consequently, positioning of the optical axes of the plurality of optical fibers with respect to a plurality of optical axes of other optical component can be made exactly and easily, by connecting with the other optical component by utilizing the flat surface on the outside of the tube.

Shape of the outer surface of the tube is not limited to a particular shape as long as it includes the flat surface. Also the number of the flat surfaces formed is also not limited. For example, cross section of the outer surface may be made circular, while removing a part or a plurality of parts thereof by grinding or cutting thereby forming the flat surface. Or, alternatively, cross section of the outer surface may be formed in a polygon such as triangle, quadrangle or hexagon, while using at least one partial-surface of the outer surface as the flat surface described above. The polygon such as triangle, quadrangle or hexagon may not be a polygon in the exact meaning of the geometrical terminology, and includes such a configuration that has corners chamfered or rounded in order to prevent the corners from being cracked or chipped off. Preferable shape of the cross section of the outer surface is quadrangle, particularly square.

Shape of the insertion hole makes it possible to insert a plurality of optical fibers therein and hold them in an ordered arrangement without crossing each other, preferably adjoining each other, and the cross section of the insertion hole may specifically be substantially quadrangular. The "substantially quadrangular" shapes include rectangule, parallelogram, orthorhombic, and square. The quadrangle may not be a quadrangle in the exact meaning of the geometrical terminology, and includes such a configuration that has corners chamfered or slightly rounded in order to prevent the stress from concentrating at the corners. When the optical fibers are inserted into an insertion hole of substantially quadrangle cross section, the optical fibers make point contact with the wall surface of the insertion hole in the cross section, with a space between the circumference of the optical fiber and the corners of the insertion hole. As a result, when an adhesive or the like is applied to the optical fibers before being inserted, the adhesive or the like can be squeezed into the space, thereby minimizing the resistance against insertion of the optical fibers. Also since an adhesive or the like having lower viscosity can be poured into the space after the optical fibers have been inserted, breakage of the optical fibers during inserting operation can be prevented. Preferable shape of the cross section of the insertion hole is square. In this case, the center line that connects the centers of the plurality of optical fibers held in ordered arrangement in the insertion hole can be made coincide with the diagonal line that connects an opposing pair of corners of the insertion hole.

Preferably, the cross section of the outer surface is square and the cross section of the insertion hole is square, and more preferably the phases of the square cross section of the outer surface and the square cross section of the insertion hole are relatively offset with each other by an angle of 45°. With this configuration, the center line connecting the centers of the plurality of optical fibers held in ordered arrangement in the insertion hole becomes parallel to opposing two partial-surface of the outer surface, and perpendicular to the other opposing two partial-surface of the outer surface. Consequently, optical axis of the optical fiber can be aligned with the optical axis of the other optical component accurately and easily, by using the partial-surface parallel to the center line and the partial-surface perpendicular to the center line.

In the configuration described above, at least one of the end openings of the insertion hole of the capillary tube can be provided with a flared portion that smoothly continues to the insertion hole. With such a flared portion, it is made easier to insert the plurality of optical fibers into the insertion hole.

While the optical fiber holding capillary tube of the present invention may be made of such materials as ceramics and resins, it is preferably formed from glass. It is because the optical fiber holding capillary tube made of glass has wearing characteristic similar to that of an optical fiber made of quartz glass, and therefore can be easily ground on the connecting surface and assembling cost can be reduced since an ultraviolet-setting adhesive can be used. Also since glass drawing technique can be applied to the manufacture, manufacturing cost can be reduced, while a composition that has a thermal expansion coefficient similar to that of the optical fiber can be chosen.

As the glass material, borosilicate glass, quartz glass, glass ceramics based on lithium-aluminum-silicate or the like can be used. Thermal expansion coefficient of the glass material is preferably $1 \times 10^{-5}/°$ C. in case the optical fibers to be held are made of quartz glass having a low thermal expansion coefficient, because this prevents the end of the optical fiber from protruding or receding from the end face of the capillary tube when the temperature changes.

It has been described above that the corners in the cross section of the insertion hole are chamfered or slightly rounded, when the cross section is made quadrangle. This is for the following reason: When a glass tube is formed by heating and drawing the glass material to extend, in general, a capillary tube of high accuracy can be obtained although the glass tube is subjected to compressive stress on the outer surface and to tensile stress on the inner surface. Glass is usually broken at a point where the tensile stress is maximum. Thus when the glass tube has an angled portion on the inner surface thereof, tensile stress is expected to concentrate in this portion and is likely to break. Therefore, strength required of the optical fiber holding capillary tube is secured by rounding the corners of the insertion hole as far as possible so that concentration of tensile stress is not likely occur.

Although strength required of the optical fiber holding capillary tube made of glass is secured as described above, glass is a brittle material that may break under thermal shock. Also when the flared portion is expanded excessively, the wall thickness decreases to become more likely to break, thus requiring great care in handling. Such a drawback can be overcome by using a glass material that contains alkali ions in forming the capillary tube, and generating a compressively stressed layer on the surface by ion exchange, thereby increasing the mechanical strength. When the mechanical strength of the glass material is increased, corners on the outer and internal surfaces can be prevented from breaking due to stress concentration caused by thermal shock or other causes, and the flared portion of thinner wall can be prevented from being chipped off. As a result, it is made easier to handle the optical fiber holding capillary tube. Thus by using a glass material that contains alkali ions in forming the capillary tube and generating a compressively stressed layer on the surface by ion exchange thereby increasing the mechanical strength, reliability such as durability against thermal shock is improved and handling thereof is made easier.

According to the present invention, when a plurality of optical fibers are inserted into the insertion hole of the capillary tube, the plurality of optical fibers inserted do not cross each other and can be secured in position with high accuracy.

With such a configuration as at least one flat surface is formed on the outer surface of the capillary tube, a plurality of optical fibers held in parallel in the insertion hole thereof can be easily connected to other optical components with the optical axes thereof being aligned, by making the connection using this flat surface. When the dimensions of the flat surface are made corresponding to the layout of the optical components such as substrate optical waveguide, a plurality of optical fibers held in parallel to each other can be easily positioned and secured with respect to the optical component. A configuration where the cross section of the insertion hole is made in square shape, in particular, is preferable for holding two optical fibers in parallel to each other. A configuration where the cross section of the optical fiber holding capillary tube is made square also makes it easy to position it such as alignment of the optical axes when connecting to the other optical component or assembling.

The optical fiber holding capillary tube of the present invention, as described above, makes it possible to accurately hold a plurality of optical fibers in predetermined positions and easily position the optical fibers held therein with respect to the other optical components.

These and other objects and advantages of the present invention will become clear from the following description with reference to the accompanying drawings.

BRIEF DESCRIPTION OF THE DRAWINGS

FIG. 10 is a drawing explaining the principle of ion exchange used in the enhancement of the capillary tube, while

FIG. 12(A) is a perspective view of a capillary tube of the prior art, and FIG. 12(B) shows an end face of the capillary tube.

DETAILED DESCRIPTION OF THE PREFERRED EMBODIMENTS

Preferred embodiments of the present invention will be described below.

Figure 1A:
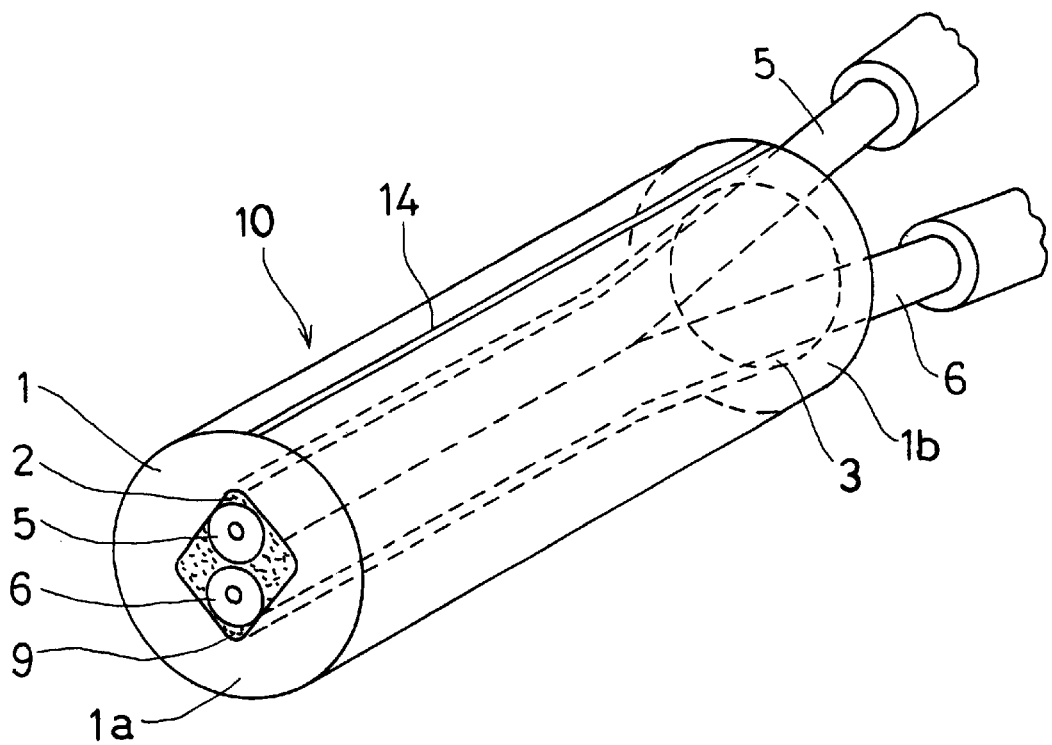
FIG. 1(A) is a perspective view of a capillary tube of an embodiment.
Figure 1B:
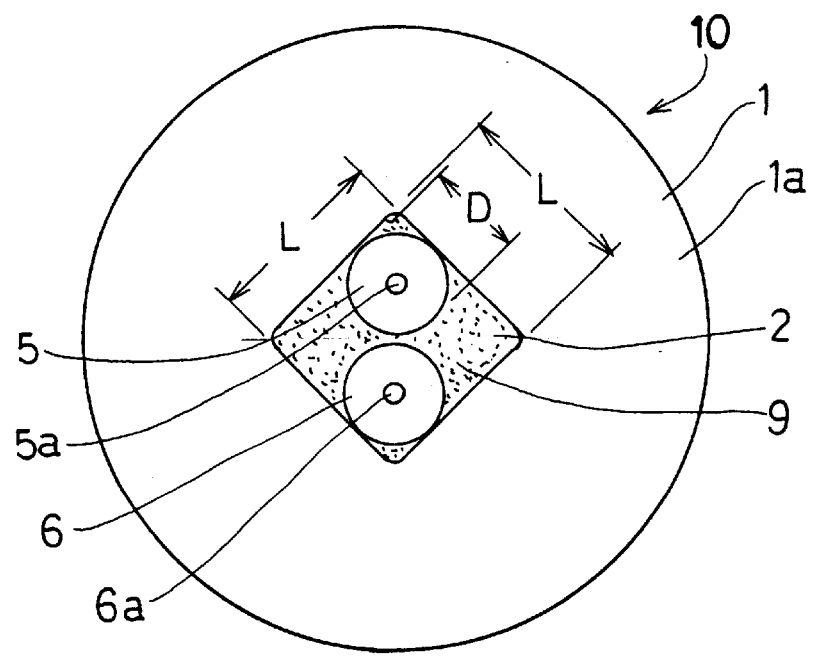
FIG. 1(B) shows an end face of the capillary tube.

FIG. 1 shows an optical fiber holding capillary tube 1 according to an embodiment of the present invention. The capillary tube 1 is made of borosilicate glass, for example, that has a thermal expansion coefficient of $5.2 \times 10^{31}$ $^6/^\circ$ C., and has a substantially circular cross section, while an insertion hole 2 has a substantially square cross section. The capillary tube is manufactured within a dimensional tolerance of 1.14 mm±0.001 mm for the outer diameter, thereby to have a high roundness. In the insertion hole 2, distance L between opposing inner wall surfaces and diameter D of the optical fiber to be inserted satisfy a relationship of $(1+2^{(k-2)/2})D < L \leq (1.05+2^{(k-2)/2})D$ (k is 1 or greater integer), in order to make it possible to insert a plurality of optical fibers having diameter D adjoining each other into the insertion hole 2. In the example shown in the drawing, relationship between the distance L and the diameter D is defined to satisfy a relation of $(1.71)D < L \leq (1.76)D$ by substituting k=1 in the expression described above, so that two optical fibers 5, 6 can be inserted to adjoin each other therein. When two optical fibers having diameter D of 125 μm are arranged and held, for example, the two optical fibers can be accurately positioned in the insertion hole 2 and held therein, by making the dimension L of the insertion hole 2 within a dimensional tolerance of 215 μm±1 μm. Provided at the rear end 1b of the capillary tube 1 is a flared portion 3 for guiding the optical fibers 5, 6 into the insertion hole 2. The flared portion 3 has an opening, for example, about 1 mm in diameter, and substantially conical shape thereby to smoothly continue to the insertion hole 2.

The capillary tube 1 may be manufactured by welding two glass members each having a groove into a single tube, thereby to form a preform having a substantially square hole. The preform is heated while controlling the dimensions and shape of the cross section and drawn into a capillary tube having the insertion hole 2 of the desired shape with high dimensional accuracy. The long capillary tube thus obtained is cut to a predetermined length and provided with the flared portion 3 at an end thereof by chemical etching or the like, thereby completing the capillary tube 1.

An example of positioning the two optical fibers 5, 6 by using the capillary tube 1 obtained as described above will be described below. Two single-mode fibers 5, 6 are inserted through the flared portion 3 into the insertion hole 2 of the capillary tube 1 to adjoin each other therein, and fastened with an epoxy resin adhesive 9. After removing a portion of optical fiber protruding beyond an end face 1a, the end face 1a is polished by a known method, thereby to make a plug 10.

Figure 2:
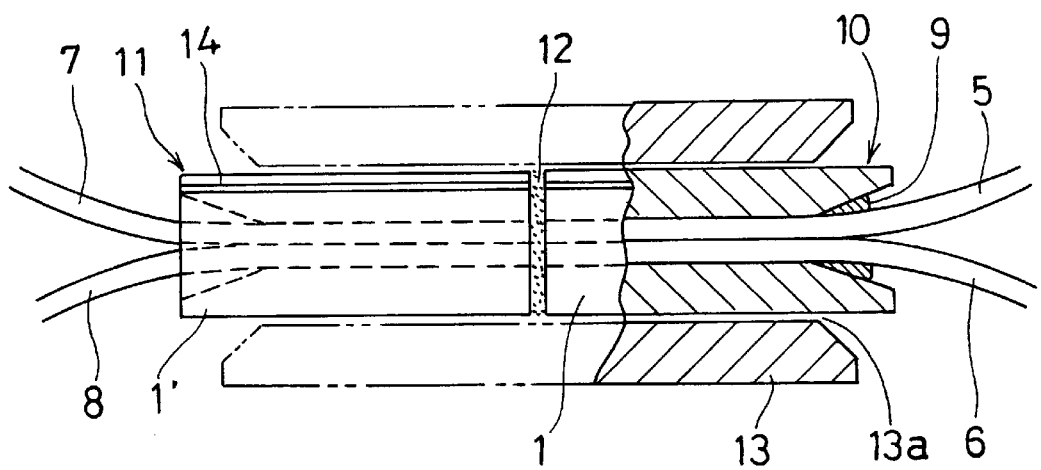
FIG. 2 is a partially cutaway view of the capillary tube of the embodiment showing an example of use thereof.

Then as shown in FIG. 2, two optical fibers 7, 8 are similarly fastened in the capillary tube 1 to make a plug 11. A refractive index matching agent 12 is applied to mating end faces of both plugs which are then inserted into a hole 13a of a glass sleeve 13, from either side thereof, that has an inner diameter 1 μm larger than the outer diameter of the capillary tube 1. The optical fibers are held to maintain the contact between the end faces 1a by using proper means such as pressing spring. Then the optical fibers are put in optimum connecting position by making relative rotation of the plugs 10, 11 while monitoring the intensity of the signal light transmitted from the optical fiber 5 to the optical fiber 7 (or from the optical fiber 6 to the optical fiber 8). In an experiment, connection loss measured in the case of optimum connecting position of the plugs 10, 11 was 0.3 dB or lower either between the optical fibers 5, 7 or between the optical fibers 6, 8. Similarly low connection loss was obtained in an experiment of using the plugs 10, 11 with cores made to protrude by processing the ends of the optical fibers to have spherical surfaces, instead of using the refractive index matching agent 12.

Alternatively, such a manufacturing method may also be employed as a straight marker 14 is provided on the outside of the capillary tube in parallel to the center axis of the insertion hole 2 as shown in FIG. 1(A), before the long capillary tube obtained by drawing the preform is cut to s predetermined length, and then a pair of capillary tubes 1, 1' are made by cutting the tube and forming the flared portions 3. The pair of capillary tubes 1, 1' are used to make the two plugs 10, 11 similarly to the above, that are inserted into a glass sleeve 13 as shown in FIG. 2. With this configuration, positioning can be done by turning the plugs 10, 11 so that the marker 14 positions agree while observing under a microscope, instead of measuring the connection loss of light between the optical fibers 5, 7 or between the optical fibers 6, 8. Connection loss of the optical fibers thus obtained was 0.3 dB or lower either between the optical fibers 5, 7 or between the optical fibers 6, 8, and it was verified through an experiment that optimum connecting position of the plugs 10, 11 can be obtained without monitoring the optical signal.

Figure 3:
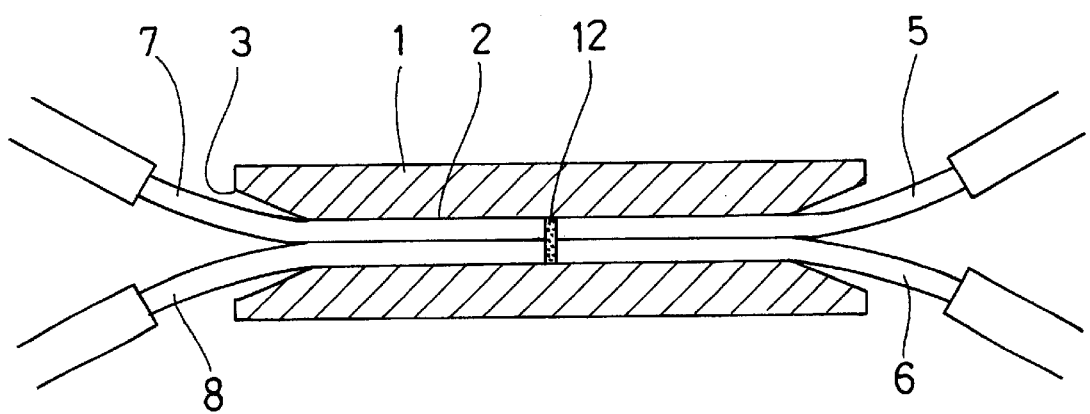
FIG. 3 is a sectional view of the capillary tube of another embodiment showing an example of use thereof.
Figure 4:
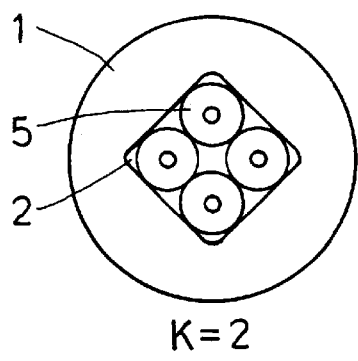
FIG. 4, FIG. 5 show end faces of the capillary tubes of other embodiments.
Figure 4:
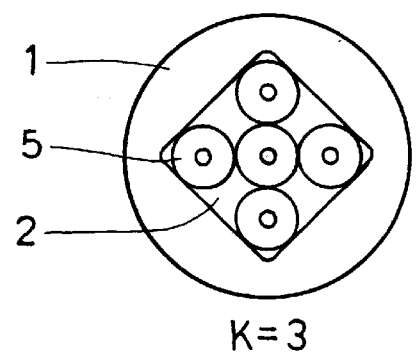
Figure 4:
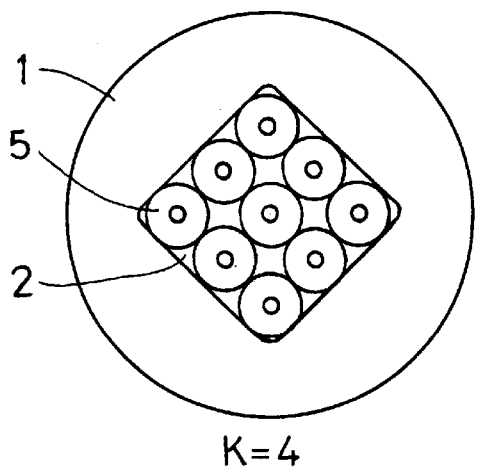
Figure 4:
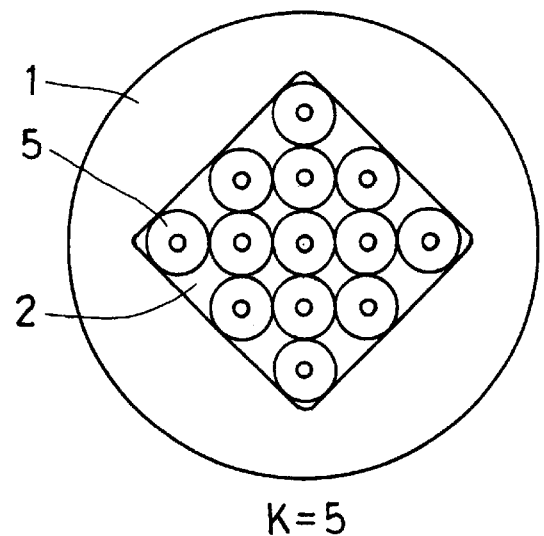

FIG. 3 shows another embodiment of the present invention. The capillary tube 1 of this embodiment has the insertion hole 2 of substantially square cross section similarly to the embodiment described above, but the insertion hole 2 has the flared portions 3 on both ends thereof. Distance L between the opposing inner walls of the insertion hole 2 is set so as to satisfy a relationship with diameter D of the optical fibers defined as $(1.71)D<L\leq(1.76)D$. In this example, diameter D of the optical fiber is 125 μm and the distance L between the opposing inner walls is 215 μm±1 μm. To connect the optical fibers, after injecting the refractive index matching agent 12 into the insertion hole 2 of the capillary tube 1, the four single-mode optical fibers 5, 6, 7, 8 having cleaved end faces are inserted into the insertion hole 2 through the flared portions 3 on both ends, so that the optical fibers 5, 7 and the optical fibers 6, 8 are brought into contact end to end, respectively, and held to keep the mating end faces in contact. At this time, since excess of the refractive index matching agent 12 is squeezed to the outside through the clearance between the substantially square insertion hole 2 and the optical fibers 5, 6, 7, 8 when the optical fibers are inserted, there is no difficulty in inserting the optical fibers and air bubbles are prevented from being included in the interface between the mating end faces being connected. In an experiment, good connection with a low connection loss of 0.3 dB or lower was achieved either between the optical fibers 5, 7 or between the optical fibers 6, 8. When the capillary tube 1 of this embodiment having the flared portions 3 on both ends is used, optical axes of the optical fibers can be accurately aligned and connection of high quality can be achieved simply by placing two optical fibers to oppose each other in the insertion hole 2 and putting them into contact.

In the capillary tube 1 of the above-mentioned embodiment, since the two adjacent optical fibers do not cross each other nor undergo rotating displacement in the insertion hole 2, relative position of the cores 5a, 5b thereof can be maintained and accurate positioning at predetermined adjoining positions can be easily made. Although this embodiment is described in the case of holding the two optical fibers arranged to adjoin each other (k=1), the invention is not limited to this configuration and various numbers, such as four (k=2), five (k=3), nine (k=4) or thirteen (k=5), of optical fibers may be inserted into the insertion hole 2 to ajoing each other as shown in FIG. 4(a) through (d).

Figure 5:
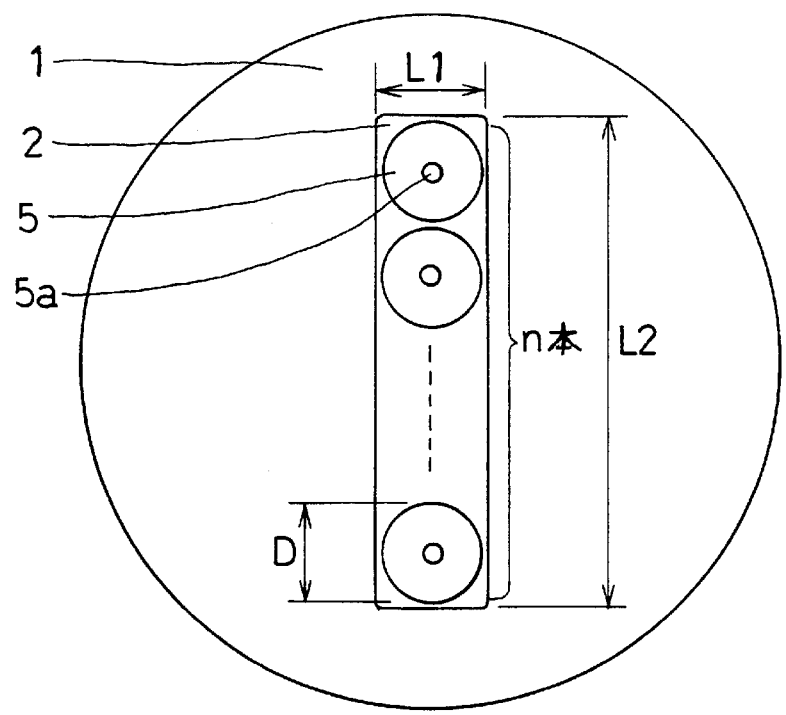
Figure 6:
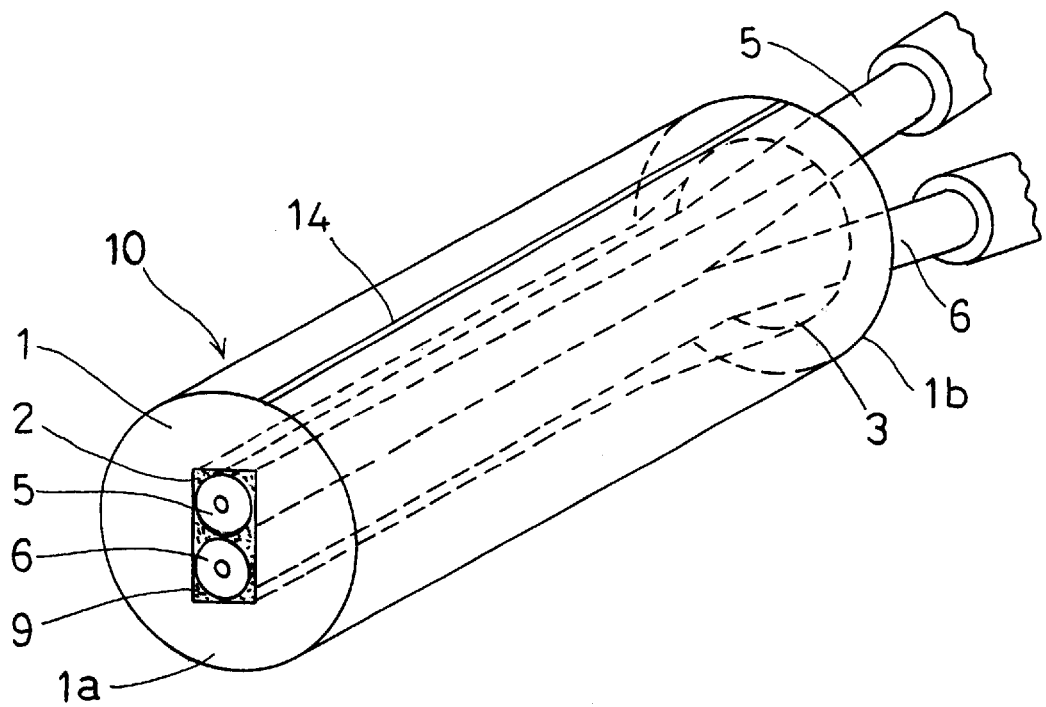
FIG. 6(A) is a perspective view of a capillary tube of another embodiment.
FIG. 6(B) shows an end face of the capillary tube.
Figure 6:
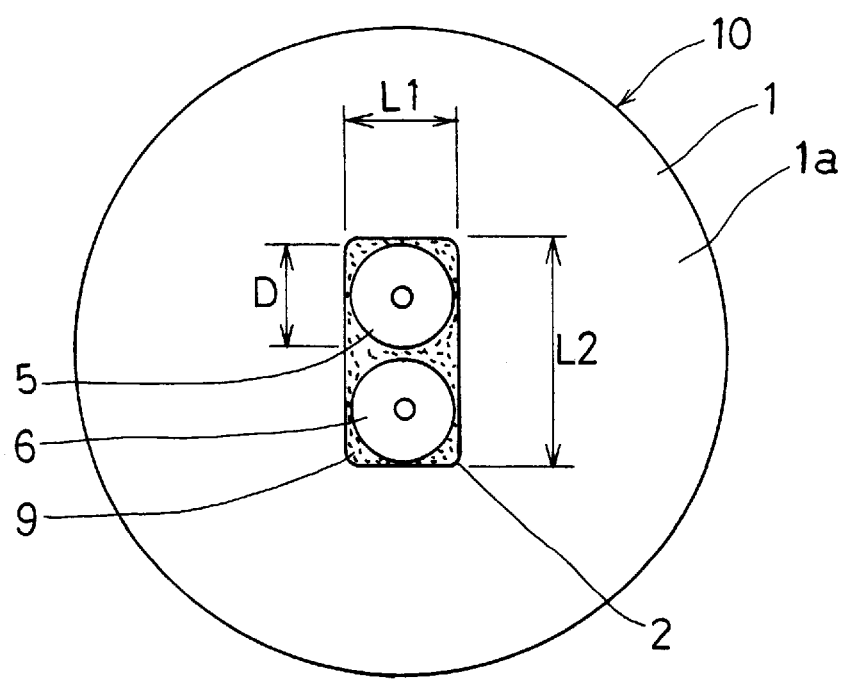

FIG. 5 shows the optical fiber holding capillary tube 1 of another embodiment of the present invention. The capillary tube 1 of this embodiment has a substantially circular cross section and the insertion hole 2 has a substantially rectangular cross section. The capillary tube is manufactured within a dimensional tolerance of 1.14 mm±0.001 mm for the outer diameter, thereby to have a high roundness. In the insertion hole 2, distance L1 between opposing longer sides and diameter D of the optical fiber satisfy a relationship of $D<L1\leq(1.05)D$ and distance L2 between the shorter sides and the diameter D of the optical fiber satisfy relationship of $nD<L2\leq(n+0.05)D$, in order to make it possible to insert a plurality of optical fibers having diameter D into the insertion hole 2 in parallel arrangement. When two optical fibers 5, 6 each having diameter D of 125 μm are held in parallel to each other as shown in FIG. 6, for example, the insertion hole 2 is made within a dimensional tolerance of 127 μm±1 μm for the distance L1 between longer sides and within a dimensional tolerance of 252 μm±1 μm for the distance L2 between shorter sides. This makes it possible to accurately position the two optical fibers 5, 6 of diameter D in the insertion hole 2 and hold them in parallel therein. Provided at the rear end 1b of the capillary tube 1 is the flared portion 3 for guiding the optical fibers 5, 6 into the insertion hole 2.

Although this embodiment is described in the case of holding the two optical fibers in parallel to each other, the invention is not limited to this configuration and the capillary tube may be made in other configuration as long as it can hold a plurality, namely from two to about 32 pieces, of optical fibers used in a multiple core optical fiber ribbon or a multiple core cable accurately in parallel to each other. With other respect, this embodiment is similar to the embodiment described previously, and repetitive description is avoided.

Figure 7:
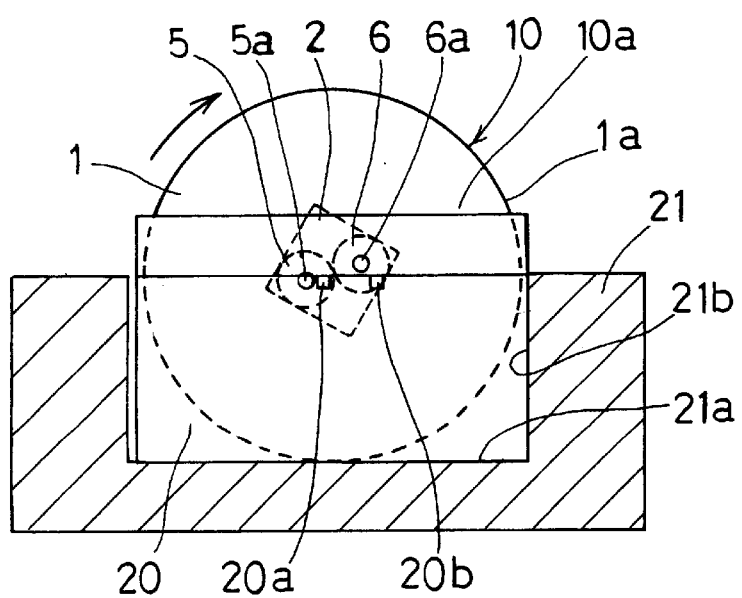
FIG. 7 is a drawing explaining a case where a plurality of optical fibers are connected to a substrate optical waveguide by using the capillary tube shown in FIG. 1.

As described previously, when a plurality of optical fibers are connected to an optical waveguide of a substrate optical waveguide, for example, the plug 10 shown in FIG. 1(A) is secured in a holder 21 with an adhesive (not shown) in such a state as an outer surface 1a of the capillary tube of circular cross section brought into contact with a bottom surface 21a and side walls 21b of the holder 21, an end face 10a is put in contact with an end face of a substrate optical waveguide 20 secured in the holder 21, and the optical fibers 5, 6 of the plug 10 are positioned with respect to optical waveguides 20a, 20b of the substrate optical waveguide 20 as shown in FIG. 7. With this structure of connection, when the external surface 1a of the capillary tube 1 is brought into contact with the bottom surface 21a and side walls 21b of the holder 21 and the end face 10a is put in contact with the end face of the substrate optical waveguide 20, the plug 10 can be positioned in the lateral and axial directions with respect to the substrate optical waveguide 20.

However, since the capillary tube 1 has a circular cross section, position of the plug 10 in the circumferential direction with respect to the substrate optical waveguide 20 is not determined under this condition, and therefore the optical fibers 5, 6 and the optical waveguides 20a, 20b are not positioned accurately with respect to each other. Consequently, it is necessary to set the optical fibers 5, 6 at optimum positions with respect to the optical waveguides 20a, 20b by making fine adjustment of the position of the plug 10 in the circumferential direction while monitoring light coming into and out of the cores 5a, 6a of the optical fibers 5, 6 with optical measuring means such as power meter. This results in such a problem that it takes much labor to connect the optical fibers. An embodiment described below eliminates such a drawback.

Figure 8A:
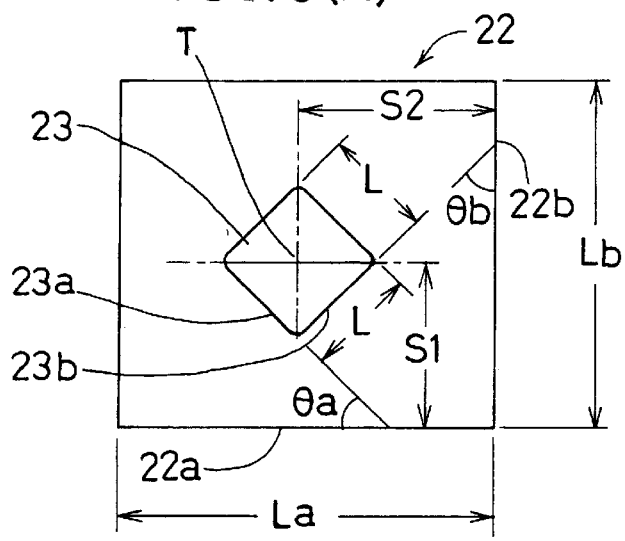
FIG. 8(A) shows an end face of a capillary tube of another embodiment.
Figure 8B:
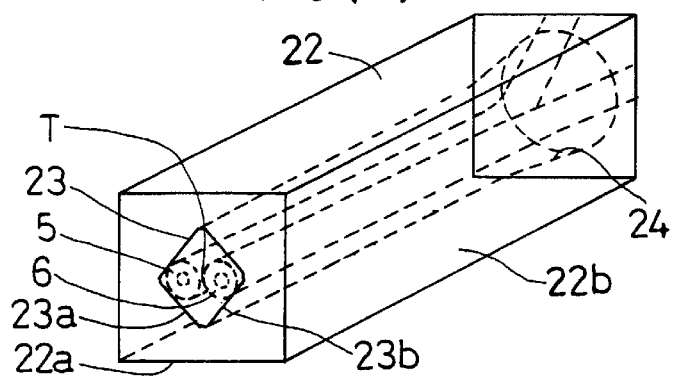
FIG. 8(B) is a perspective view of the capillary tube and FIG. 8(C) is an enlarged perspective view of the end face of the capillary tube.
Figure 8C:
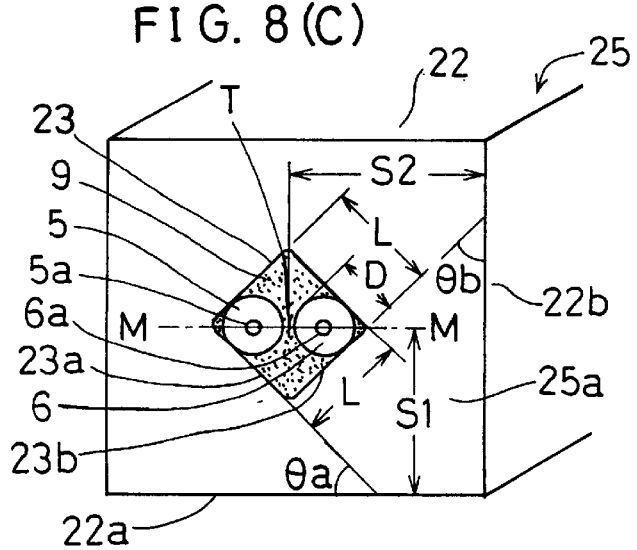

FIG. 8 shows a glass fiber holding capillary tube 22 of another embodiment of the present invention. In the capillary tube 22 of this embodiment, the cross section of the outer surface is substantially square, and the cross section of the insertion hole 23 is substantially square. Widths La, Lb have a high dimensional accuracy of 1150 $\mu$m±1.0 $\mu$m, and the insertion hole 23 is made to allow two optical fibers 5, 6 to be inserted and arranged to adjoin each other therein. The phases of the outer surface and the insertion hole 23 are relatively offset with each other. In this embodiment, angles θa, θb which the sides 23a, 23b of the insertion hole 23 form with flat surfaces 22a, 22b of the outer surface are acute angles of 45°±0.5°. Consequently, the flat surface 22a becomes substantially parallel to the center line M connecting the centers of the cores 5a, 6a of the two optical fibers 5, 6 inserted in the insertion hole 23, and the flat surface 22b becomes substantially perpendicular to the center line M.

The insertion hole 23 of the capillary tube 22 is made so that the dimensions L of the sides 23a, 23b are both within tolerance of 215 $\mu$m±1.0 $\mu$m, while the distance S1 from the center T to the flat surface 22a of the outer surface and the distance S2 from the center T to the flat surface 22b of the outer surface are both within a tolerance of 574 $\mu$m±1.0 $\mu$m. Thus the insertion hole 23 is made to allow the two optical fibers 5, 6 of diameter 125 $\mu$m comprising the cores 5a, 6a, with coating layers removed, and cladding to be inserted adjoining each other and positioned with high accuracy. In this embodiment, the two optical fibers 5, 6 can be held adjoining each other on the diagonal line that connects opposing pair of corners of the insertion hole 23. The corners of the insertion hole 23 are rounded in order to prevent tensile stress from concentrating at the corners. Provided at the rear opening end of the capillary tube 22 is a flared portion 24 for guiding the optical fibers 5, 6 into the insertion hole 23. The flared portion 24 has an opening about 0.7 mm in diameter, and substantially conical shape thereby to smoothly continue to the insertion hole 23.

An example of method for forming the capillary tube 22 from glass will be described below. The capillary tube 22 may be manufactured by welding two glass members each having a groove into a single tube, thereby to form a preform having a substantially square hole. Then the circumference of the glass tube is ground into substantially square shape taking reference to the hole, to make a preliminary tube. The preliminary tube is heated while controlling the dimensions and shape of the cross section and drawn into a long capillary tube having the insertion hole 23 of desired dimensional accuracy. The long capillary tube thus obtained is cut into a predetermined length and provided with the flared portion 24 at an end thereof by chemical etching or the like, thereby completing the capillary tube 22.

An example of positioning the two optical fibers 5, 6 to other optical component, for example, on the substrate optical waveguide 20 and connecting to the optical waveguides 20a, 20b, respectively, by using the capillary tube 22 obtained as described above will be described below. Two single-mode fibers 5, 6 are inserted through the flared portion 24 into the insertion hole 23 of the capillary tube 22 and fastened with the epoxy resin adhesive 9 as shown in FIG. 8(B), (C). After removing a portion of the optical fiber protruding from an end face 25a, the end face 25a is polished by a known method, or the end faces of the optical fibers 5, 6 are formed into spherical shape by spherically polishing, thermal forming such as electric discharge machining, etching or other process, so that the cores 5a, 6a protrude beyond the cladding, thereby making the plugs 25.

Figure 9A:
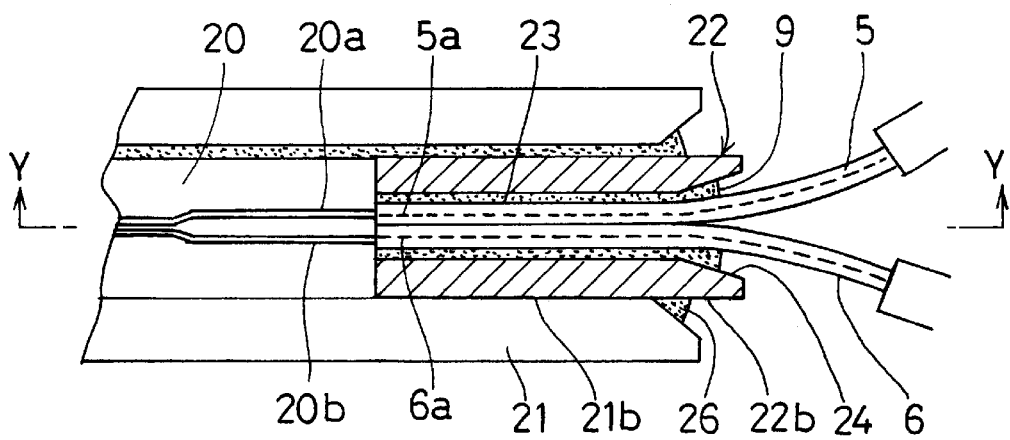
FIG. 9(A) is a partially cutaway view showing a case where the capillary tube of the embodiment is connected to a substrate optical waveguide.
Figure 9B:
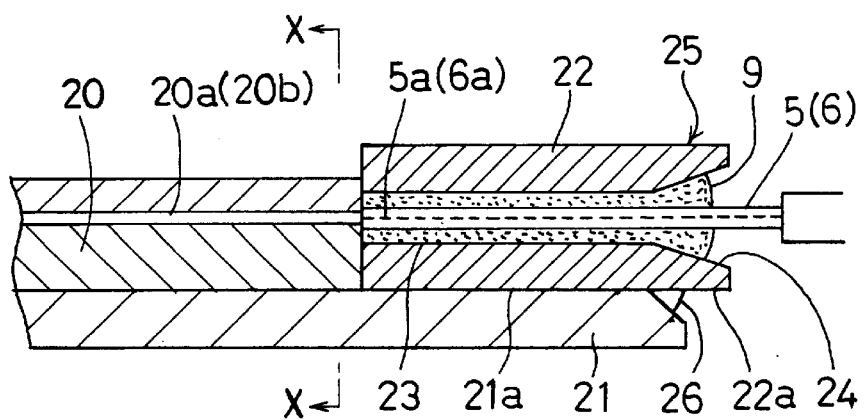
FIG. 9(B) is a sectional view taken along line Y—Y in FIG. 9(A) and FIG. 9(C) is a sectional view taken along line X—X in FIG. 9(B)
Figure 9C:
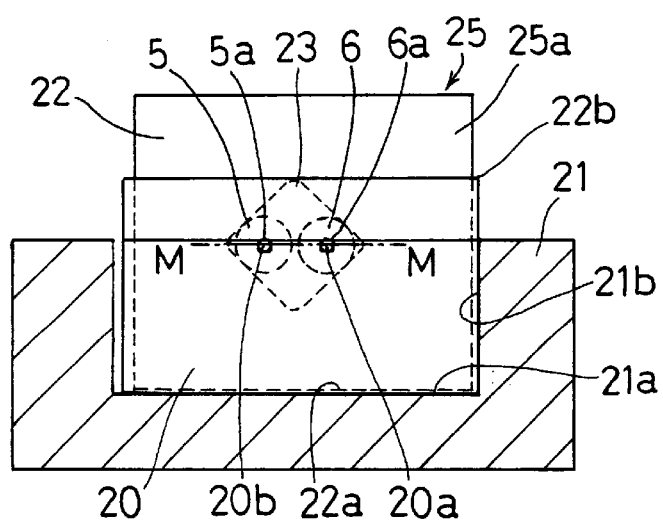

Then as shown in FIG. 9, the end face 25a of the plug 25 is connected to the end face of the substrate optical waveguide 20 secured in the holder 21 via the refractive index matching agent, by bringing the flat surface 22a of the plug 25 into contact with the bottom surface 21a and the flat surface 22b into contact with the side wall surface 21b, or the cores 5a, 6a of the optical fibers 5, 6 that have been formed in spherical shape and made protrude are pressured into contact. This causes the optical axes of the cores 5a, 6a of the optical fibers 5, 6 held by the plug 25 and the optical axes of the optical waveguides 20a, 20b of the substrate optical waveguide 20 to be accurately positioned. By fastening the plug 25 to the holder 21 with an adhesive 26 while maintaining this condition, connecting process is completed.

When connecting the optical fibers 5, 6 to the optical waveguides 20a, 20b of the substrate optical waveguide 20 by using the capillary tube 22 of the present invention, since the two optical fibers 5, 6 inserted side by side do not cross each other in the insertion hole 23, relative positions of the cores 5a, 6a of the optical fibers 5, 6 with the flat surfaces 22a, 22b of the capillary tube 22 can be maintained. Also by holding the plug 25 connected to the substrate optical waveguide 20 using the flat surfaces 22a, 22b, the optical axes of the cores 5a, 6a of the optical fibers 5, 6 and the optical axes of the optical waveguides 20a, 20b can be accurately and easily positioned at the optimum position. Specifically, both components can be connected with optical matching and positioned at such a position that causes the minimum is connection loss of 0.3 dB or lower, while achieving return loss exceeding 50 dB.

While a case of making the insertion hole 23 of the capillary tube 22 in square cross section is described for the above embodiment, the cross section may also be rectangular and at the same time the corners are preferably rounded. Also the outer surface of the capillary tube 22 is described as made in square cross section, although the cross section may be rectangular or hexagonal. Or, alternatively, the outer surface of the capillary tube 22 may also be made in circular cross section with a part or a plurality of parts removed by grinding or cutting, thereby to form flat surface that can be used for relative positioning with other optical component. In the embodiment shown in the drawing, the outer surface of capillary tube 22 and the insertion hole 23 are in square cross section respectively and concentric with each other, while the phases thereof are offset with each other by 45° around the center thereof. In this case, two opposing partial-surfaces of the outer surface can be made parallel to and the remaining two partial-surfaces perpendicular to a plane (a plane that contains the center line M), which contains the centers of the two of optical fibers 5, 6 held in ordered arrangement in the insertion hole 23. Consequently, the positioning and alignment of the optical axis can be easy in a case where the optical fibers are connected to such a optical component as shown in FIG. 9, in which the two optical waveguides 20a, 20b formed in the same plane on the substrate optical waveguide 20.

Figure 10A:
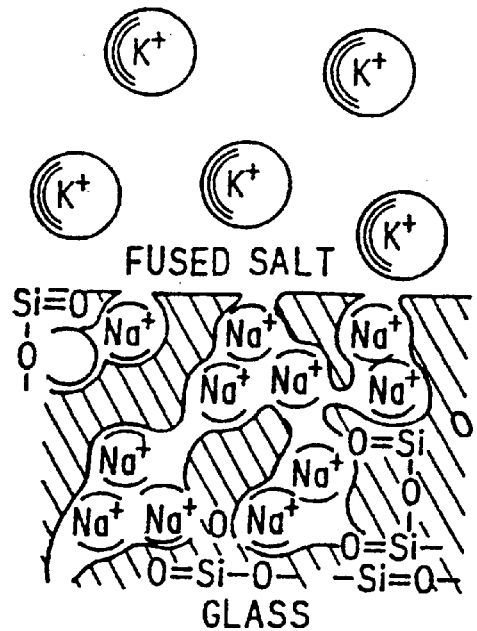
FIG. 10(A) shows a state before ion exchange and FIG. 10(B) shows a state after ion exchange.
Figure 10B:
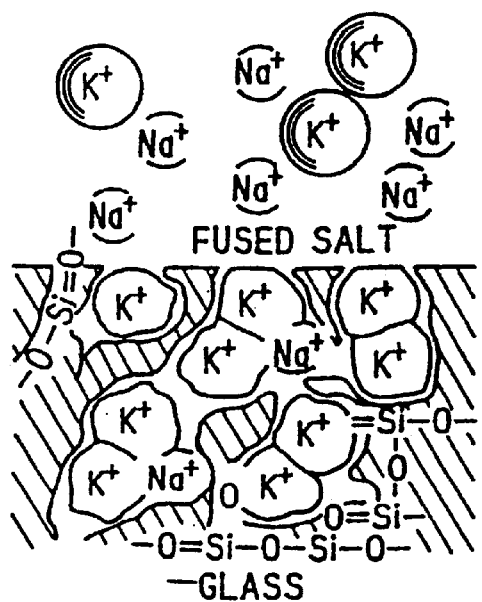

The optical fiber holding capillary tube of the embodiments described above can be made of a glass material that contains alkali ions, while generating a compressively stressed layer in the surface by ion exchange, thereby increasing the mechanical strength. FIG. 10 shows the principle of ion exchange for strengthening the capillary tube. FIG. 10(A) shows the state before ion exchange and FIG. 10(B) shows the state after ion exchange. First, alkali ions (Li, Na) contained in glass kept at a temperature lower than annealing temperature are substituted by alkali ions that have greater ionic radiuses (Na for Li, and K for Na), thereby generating a compressively stressed layer in the surface of the glass and increasing the strength. This process has such advantages as (i) mechanical strength can be increased to twice or higher than that obtained by air-cooling strengthening; (ii) there is no limitation imposed by the configuration and wall thickness; (iii) high dimensional accuracy can be obtained since deformation hardly occur; (iv) the process can be applied even to a specimen too small to hold; and (v) the strengthened layer holds on unlike a protective film that may peel off.

Figure 11A:
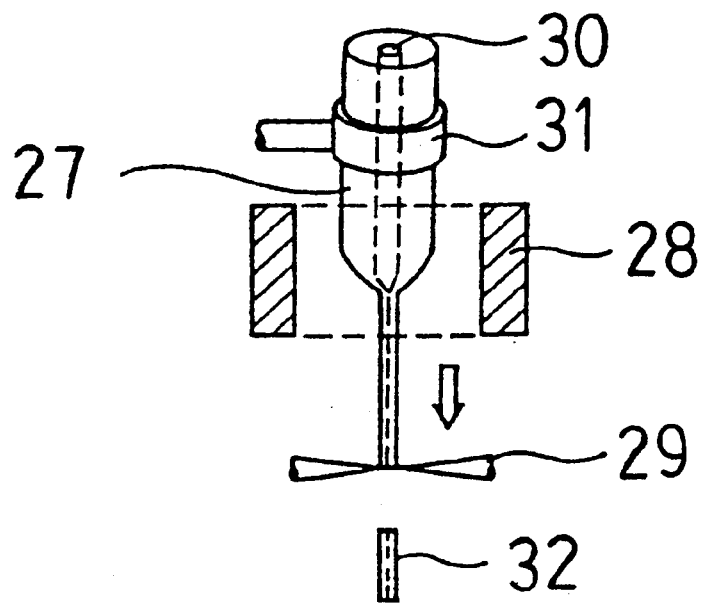
FIG. 11(A) schematically shows a drawing apparatus used in the manufacture of the capillary tube, and FIG. 11(B) schematically shows an ion exchange processing apparatus.

FIG. 11(A) is a schematic diagram of an apparatus of manufacturing the capillary tube of this embodiment. The apparatus is basically the same as an optical fiber drawing apparatus and has such a configuration as a preform 27 made of glass is heated in a drawing furnace 28 and drawn, then cut by a cutter 29 to the length of a capillary tube 32. The glass preform 27 has a hole 30 at the center thereof, and is held by a clamp 31. The capillary tube 32 has a flared portion formed thereon. Centering of the capillary tube 32 is carried out only in the glass drawing process.

Figure 11B:
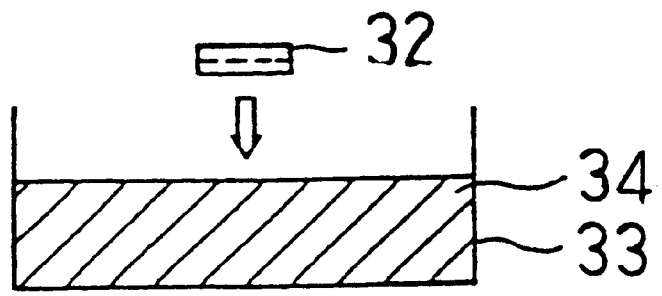

FIG. 11(B) is a schematic diagram of an ion exchange treatment apparatus. The capillary tube 32 that has been cut and provided with the flared portion in the process shown in FIG. 11(A) is dipped in a molten salt 34 contained in an ion exchange bath 33, and is subjected to heat treatment. The ion exchange treatment is, for example, such that the capillary tube 32 made of borosilicate glass containing 3 to 10% of $Na_2O$ is immersed in molten salt of $KNO_3$ that is kept at about 400° C. for 10 hours. In a 3-point bending strength test, the capillary tube 32 that has undergone the ion exchange treatment as described above was found to have mechanical strength twice or higher than that of an untreated capillary tube.

100 plugs made each of the capillary tube 32 that has undergone the ion exchange treatment and the untreated capillary tube were subjected to thermal shock test wherein the plugs were rapidly heated to 400° C. and then cooled down rapidly. The results are that no damage was observed in the plugs made of the capillary tube 32 that has undergone the ion exchange treatment, but about 10 to 12% of the plugs made of the untreated capillary tube were damaged.

While there has been described what are at present considered to be preferred embodiments of the present invention, it will be understood that various modifications may be made thereto, and it is intended that the appended claims cover all such modifications as fall within the true spirit and scope of the invention.

What is claimed is:

1. An optical fiber holding capillary tube comprising an insertion hole of substantially quadrangular cross section for holding a plurality of optical fibers inserted and held in ordered arrangement therein, wherein the cross section of the insertion hole is substantially square, and wherein in order to make it possible to insert a plurality of optical fibers each having diameter D into the insertion hole while adjoining each other, distance L between opposing inner wall surfaces of the insertion hole and diameter D of the optical fiber satisfy a relationship of $(1+2^{(k-2)/2})D<L\leq(1.05+2^{(k-2)/2})D$ (where k is 1 or greater integer).

2. An optical fiber holding capillary tube according to claim 1, wherein the optical fiber holding capillary tube is made of a glass material, the glass material containing alkali ions and provided with a compressively stressed layer formed on surface thereof by ion exchange thereby to increase mechanical strength thereof.

3. An optical fiber holding capillary tube according to claim 1, wherein the insertion hole is provided on at least one open end thereof with a flared portion that smoothly continues to the insertion hole.

4. An optical fiber connecting structure comprising:

an optical fiber holding capillary tube comprising an insertion hole of substantially square cross section, wherein in order to make it possible to insert a plurality of optical fibers each having diameter D into the insertion hole while adjoining each other, distance L between opposing inner wall surfaces of the insertion hole and diameter D of the optical fiber satisfy a relationship of $(1+2^{(k-2)/2})D<L\leq(1.05+2^{(k-2)/2})D$ (where k is 1 or greater integer);

the plurality of optical fibers held in ordered arrangement in the insertion hole of the optical fiber holding capillary tube;

an optical component having a plurality of optical axes at the same intervals as that of the plurality of optical fibers held in ordered arrangement in the insertion hole of the optical fiber holding capillary tube; and a holding means for positioning the plurality of optical fibers in ordered arrangement in the insertion hole of the optical fiber holding capillary tube with respect to the plurality of optical axes of the optical component while maintaining optical matching, respectively.

5. An optical fiber connecting structure comprising:

an optical fiber holding capillary tube comprising an insertion hole of substantially square cross section, wherein in order to make it possible to insert a plurality of optical fibers each having diameter D into the insertion hole while adjoining each other, distance L between opposing inner wall surfaces of the insertion hole and diameter D of the optical fiber satisfy a relationship of $(1+2^{(k-2)/2})D<L\leq(1.05+2^{(k-2)/2})D$ (where k is 1 or greater integer); and the plurality of pairs optical fibers inserted into the insertion hole of the optical fiber holding capillary tube from one open end and the other open end of the insertion hole respectively, to be held in an ordered arrangement into the insertion hole and put into contact with each other on the end faces thereof.

6. An optical fiber holding capillary tube comprising an insertion hole of substantially quadrangular cross section for holding a plurality of optical fibers inserted and held in an ordered arrangement therein, wherein the cross section of the insertion hole is substantially rectangular, and wherein in order to make it possible to insert n pieces of optical fibers $(2\leq n)$ each having diameter D into the insertion hole while adjoining each other, distance L1 between opposing longer sides of the insertion hole, distance L2 between the shorter sides of the insertion hole and diameter D of the optical fiber satisfy relationships of D<L1≦(1.05)D and nD<L2≦(n+0.05)D.

7. An optical fiber holding capillary tube according to claim 6, wherein the optical fiber holding capillary tube is made of a glass material, the glass material containing alkali ions and provided with a compressively stressed layer on surface thereof by ion exchange thereby to increase mechanical strength.

8. An optical fiber holding capillary tube according to claim 6, wherein the insertion hole is provided on at least one open end thereof with a flared portion that smoothly continues to the insertion hole.

9. An optical fiber connecting structure comprising:

an optical fiber holding capillary tube comprising an insertion hole of substantially rectangular cross section, wherein in order to make it possible to insert n pieces of optical fiber (n<2) each having diameter D into the insertion hole while adjoining each other, distance L1 between opposing longer sides of the insertion hole, distance L2 between shorter sides of the insertion hole and diameter D of the optical fiber satisfy relationships of D<L1≦(1.05)D and nD<L2≦(n+0.05)D;

the plurality of optical fibers held in ordered arrangement in the insertion hole of the optical fiber holding capillary tube;

an optical component having a plurality of optical axes at the same intervals as that of the plurality of optical fibers held in ordered arrangement in the insertion hole of the optical fiber holding capillary tube; and a holding means for positioning the plurality of optical fibers held in ordered arrangement in the insertion hole of the optical fiber holding capillary tube with respect to the plurality of optical axes of the optical component while maintaining optical matching, respectively.

10. An optical fiber connecting structure comprising:

an optical fiber holding capillary tube comprising an insertion hole of substantially rectangular cross section, wherein in order to make it possible to insert n pieces of optical fiber (n≦2) each having diameter D into the insertion hole while adjoining each other, distance L1 between opposing longer sides of the insertion hole, distance L2 between shorter sides of the insertion hole and diameter D of the optical fiber satisfy relationships of D<L1≦(1.05)D and nD<L2≦(n+0.05)D; and the plurality of pairs of optical fibers inserted into the insertion hole of the optical fiber holding capillary tube from one open end and the other open end of of the insertion hole respectively, to be held in an ordered arrangement in the insertion hole and put into contact with each other on the end faces thereof.

11. An optical fiber holding capillary tube comprising:

a capillary tube body extending along and about a center axis, the capillary tube body being fabricated from glass material as a unitary construction;

an insertion hole extending centrally through the capillary tube body along and about the center axis and having a substantially quadrangular cross section defined by four sidewalls, the insertion hole sized and adapted for holding a plurality of optical fibers inserted therein in an ordered arrangement; and at least one flat surface provided on an outer surface of the capillary tube body, the flat surface forming an acute angle with an associated sidewall of the insertion hole and located at a predetermined distance from the center axis.

12. An optical fiber holding capillary tube according to claim 11, wherein the cross section of the outer surface is substantially polygonal.

13. An optical fiber holding capillary tube according to claim 11, wherein a diagonal connecting opposing corners of the insertion hole substantially corresponds with a center line connecting the centers of the optical fibers held in an ordered arrangement in the insertion hole.

14. An optical fiber holding capillary tube according to claim 11, wherein the cross section of the outer surface is substantially square and the cross section of the insertion hole is substantially square.

15. An optical fiber holding capillary tube according to claim 11, wherein the angle formed by the flat surface and the associated sidewall of the insertion hole is substantially 45°.

16. An optical fiber holding capillary tube according to claim 11, wherein the optical fiber holding capillary tube is made of a glass material.

17. An optical fiber holding capillary tube according to claim 11, wherein the glass material contains alkali ions and provided with a compressively stressed layer formed on surface thereof by ion exchange thereby to increase mechanical strength.

18. An optical fiber holding capillary tube according to claim 11, wherein the insertion hole is provided on at least one open end thereof with a flared portion that smoothly continues to the insertion hole.

19. An optical fiber connecting structure comprising:

an optical fiber holding capillary tube comprising an insertion hole of substantially quadrangular cross section and at least one flat surface provided on an outer surface thereof, the flat surface forming a acute angle with the side of the insertion hole and located at a predetermined distance from the center of the insertion hole;

a plurality of optical fibers held in an ordered arrangement in the insertion hole of the optical fiber holding capillary tube; and an optical component having a plurality of optical axes and fastening surface for fastening the optical fiber holding capillary tube, the flat surface of the optical fiber holding capillary tube being brought into contact with the fastening surface thereby to position the optical axes with respect to the corresponding optical fibers while maintaining optical matching, respectively.

20. An optical fiber connecting structure according to claim 19 wherein the plurality of optical axes of the optical component are a plurality of optical axes of optical waveguide.

* * * * *

UNITED STATES PATENT AND TRADEMARK OFFICE
CERTIFICATE OF CORRECTION

PATENT NO. : 6,322,256 B1
DATED : November 27, 2001
INVENTOR(S) : Katsumi Inada et al.

It is certified that error appears in the above-identified patent and that said Letters Patent is hereby corrected as shown below:

Column 2,
Lines 14 and 15, delete "$1+1/\sqrt{2}\approx1.71$ and $1.05+1/\sqrt{2}\approx1.76$", and substitute therefor -- $1+1/\sqrt{2}\fallingdotseq1.71$ and $1.05+1/\sqrt{2}\fallingdotseq1.76$ --; and
Line 46, delete "$L1<(1.05D)$", and substitute therefor -- $L1\leq(1.05D)$ --.

Column 6,
Line 19, please delete "$5.2\times10^{31\ 6}/°$ C.", and substitute therefor -- $5.2\times10^{-6}/°$ C. --.
Lines 26-27, please delete "$(1+2^{(k-2)/2})D<L\leq(1.05+2^{(k-2)/2})D$", and substitute therefor -- $(1+2^{(k-2)/2})D<L\leq(1.05+2^{(k-2)/2})D$ --.

Column 7,
Line 23, delete "s", and substitute therefor -- a --.

Column 10,
Line 42, delete "is".

Column 12,
Line 6, please delete "$(1+2^{(k-2)/2})DL<L\leq(1.05+2^{(k-2)/2})D$", and substitute therefor -- $(1+2^{(k-2)/2})D<L\leq(1.05+2^{(k-2)/2})D$ --.

Column 13,
Line 17, please delete "$(n<2)$", and substitute therefor -- $(2\leq n)$ --.
Line 39, please delete "$(n\leq2)$", and substitute therefor -- $(2\leq n)$ --.
Line 41, delete "of", second occurrence.

Signed and Sealed this

Eleventh Day of May, 2004

JON W. DUDAS
*Acting Director of the United States Patent and Trademark Office*